(12) United States Patent
Cormode et al.

(10) Patent No.: US 8,875,305 B2
(45) Date of Patent: *Oct. 28, 2014

(54) ANONYMIZATION OF DATA OVER MULTIPLE TEMPORAL RELEASES

(71) Applicant: AT&T Intellectual Property I, L.P., Atlanta, GA (US)

(72) Inventors: Graham Cormode, Morristown, NJ (US); Smriti Bhagat, San Francisco, CA (US); Balanchander Krishnamurthy, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,588

(22) Filed: May 6, 2013

(65) Prior Publication Data

US 2013/0247214 A1    Sep. 19, 2013

Related U.S. Application Data

(63) Continuation of application No. 12/830,685, filed on Jul. 6, 2010, now Pat. No. 8,438,650.

(51) Int. Cl.
*H04L 29/06* (2006.01)
*G06F 21/62* (2013.01)

(52) U.S. Cl.
CPC ........ *G06F 21/6254* (2013.01); *H04L 63/0421* (2013.01)
USPC ........................................................... 726/26

(58) Field of Classification Search
CPC ................... H04L 63/0421; G06F 21/6254

USPC ............................................................ 726/26
See application file for complete search history.

(56) References Cited

U.S. PATENT DOCUMENTS

| 6,397,224 | B1* | 5/2002 | Zubeldia et al. ........................ 1/1 |
| 7,984,169 | B2* | 7/2011 | Brunell et al. ................ 709/229 |
| 2003/0158960 | A1* | 8/2003 | Engberg ......................... 709/237 |
| 2004/0210770 | A1* | 10/2004 | Sanin et al. .................... 713/201 |
| 2005/0197177 | A1* | 9/2005 | Charasika ........................ 462/28 |
| 2006/0031301 | A1* | 2/2006 | Herz et al. ..................... 709/206 |
| 2006/0059149 | A1* | 3/2006 | Dunki et al. ....................... 707/6 |
| 2008/0005264 | A1* | 1/2008 | Brunell et al. ................ 709/217 |
| 2009/0303237 | A1* | 12/2009 | Liu et al. ........................ 345/440 |
| 2010/0014657 | A1* | 1/2010 | Kerschbaum et al. .......... 380/28 |
| 2010/0094758 | A1* | 4/2010 | Chamberlain et al. .......... 705/50 |

(Continued)

OTHER PUBLICATIONS

Feder et al, Anonymizing Graphs, Oct. 30, 2008, Cornell University Library, <http://arxiv.org/abs/0810.5578v1>.*

(Continued)

*Primary Examiner* — David Garcia Cervetti
(74) *Attorney, Agent, or Firm* — Hartman & Citrin LLC

(57) ABSTRACT

The present disclosure is directed to systems, methods, and computer-readable storage media for anonymizing data over multiple temporal releases. Data is received, and nodes and connections in the data are identified. The data also is analyzed to identify predicted connections. The nodes, the connections, and the predicted connections are analyzed to determine how to group the nodes in the data. The data is published, and the grouping of the nodes is extended to subsequent temporal releases of the data, the nodes of which are grouped in accordance with the grouping used with the data.

20 Claims, 7 Drawing Sheets

(56) References Cited

U.S. PATENT DOCUMENTS

| | | | | |
|---|---|---|---|---|
| 2010/0268719 A1* | 10/2010 | Cormode et al. | ............. | 707/756 |
| 2011/0041184 A1* | 2/2011 | Cormode et al. | ............... | 726/26 |
| 2011/0072142 A1* | 3/2011 | Herz et al. | ................... | 709/229 |
| 2011/0178943 A1* | 7/2011 | Motahari et al. | ............. | 705/325 |
| 2011/0191584 A1* | 8/2011 | Trostle et al. | ................ | 713/165 |
| 2011/0238829 A1* | 9/2011 | Brunell et al. | ................ | 709/224 |

OTHER PUBLICATIONS

Liu et al., Towards Identity Anonymization on Graphs, Jun. 2008, ACM.

Bhagat et al., Classbased graph anonymization for social network data, Aug. 2009, ACM.

Liben-Nowell et al., The Link Prediction Problem for Social Networks, Nov. 2003, ACM.

Backstrom et al., Wherefore Art Thou R3579X? Anonymized Social Networks, Hidden Patterns, and Structural Steganography, May 2007, ACM.

Zhou et al., A Brief Survey on Anonymization Techniques for Privacy Preserving Publishing of Social Network Data, Aug. 2007, SIGKDD Explorations, vol. 10, Issue 2.

Bhagat, S., "Prediction Promotes Privacy in Dynamic Social Networks," Proceedings of the 3rd Workshop on Online Social Networks (WOSN 2010) (Jun. 2010), pp. 1-9, [online] [retrieved on Nov. 1, 2010] retrieved from: www.usenix.org/event/wosn10/tech/full_papers/Bhagat.pdf.

U.S. Office Action dated Jul. 3, 2012 in U.S. Appl. No. 12/830,685.

U.S. Notice of Allowance dated Dec. 26, 2012 in U.S. Appl. No. 12/830,685.

* cited by examiner

ANONYMIZATION OF DATA OVER MULTIPLE TEMPORAL RELEASES

CROSS-REFERENCE TO RELATED APPLICATION

This application is a continuation of U.S. patent application Ser. No. 12/830,685, entitled "Anonymization of Data over Multiple Temporal Releases," filed Jul. 6, 2010, now U.S. Pat. No. 8,438,650, which is hereby incorporated by reference in its entirety.

BACKGROUND

This application relates generally to anonymization of data. More specifically, the disclosure provided herein relates to anonymization of data over multiple temporal releases of the data.

Anonymization of data has become important for protecting the privacy of individuals, accounts, and/or other private information associated with data that is shared for analysis, data mining, and/or other purposes. For example, entities sharing data that includes sensitive information may anonymize the data to allow others to study the data without compromising privacy of individuals or entities reflected in the data. Thus, third parties can apply new analysis and data mining techniques to the data without exposing private information of individuals or entities associated with the data.

The recent explosion of social networking services has been followed by efforts to study and understand behavior of social networking users and networks by network researches, sociologists, application developers, and other parties. Such studies require analysis of social networking data. Social networking data typically includes sensitive information relating to social networking service users. Additionally, social networks typically evolve over time, which may make study of multiple temporal releases of the social networking data interesting from an analysis standpoint.

SUMMARY

The present disclosure is directed to anonymizing data over multiple temporal releases. Data is received at a first time. The data can include network or organization information, social networking data, and the like, and may be released in the form of a graph that includes a number of nodes corresponding to a number of users. The graph also can include a number of connections between the nodes. The connections indicate that nodes touched by the connection communicate with one another.

In accordance with various embodiments, the graph is analyzed, and current connections between the nodes of the graph are identified. Additionally, predictive analysis is performed on the graph to identify predicted connections for the nodes in the graph. The predictive analysis is performed by applying one or more predictive models, which may be chosen based on design needs and/or preferences. The current connections and the predicted connections are analyzed, and the nodes are divided into one or more groups of nodes.

The current state of the graph, as well as the predicted connections that are expected to exist in a future state of the graph, are considered. The current and predicted states are used to anonymize the graph. In particular, the nodes are grouped in a manner that is expected to remain safe and useful over future releases of the graph. Various approaches for predicting connections based upon known current connections, weighting connections and grouping nodes on the bases of the predicted graph structure, and anonymizing the nodes are provided. Nodes of future releases of the graph are grouped in accordance with the grouping approach to the earlier temporal release of the graph, thereby ensuring safety of the released data over multiple releases.

According to one aspect, a computer-implemented method for anonymizing data over multiple temporal releases includes computer-implemented operations for receiving a graph relating to a temporal release of data. The graph includes two or more nodes and one or more connections between at least two of the two or more nodes. The method also can include applying a connection prediction model to the graph to identify one or more predicted connections between the two or more nodes, and grouping the two or more nodes into two or more groups of nodes. The method also can include publishing an anonymized version of the graph, the anonymized version of the graph including the two or more groups of nodes and a list identifying each of the two or more nodes in each of the two or more groups of nodes, and determining if a subsequent release of the graph has been received.

In some embodiments, applying the connection prediction model includes applying a friend-of-a-friend model to the one or more connections and the two or more nodes to identify the one or more predicted connections. The one or more predicted connections include a connection between an analyzed node of the two or more nodes and another node of the two or more nodes that is within two connections of the analyzed node. In some embodiments, applying the connection prediction model includes applying a common neighbors model to the one or more connections and the two or more nodes to identify the one or more predicted connections. The one or more predicted connections includes a connection between an analyzed node of the two or more nodes and another node of the two or more nodes that is within two connections of the analyzed node. Each of the one or more predicted connections is assigned a weight based upon a number of common neighbors shared by the analyzed node and the other node. In some embodiments, applying the connection prediction model includes applying an Adamic-Adar model to the one or more connections and the two or more nodes to identify the one or more predicted connections. In other embodiments, applying the connection prediction model includes applying a preferential attachment model to the one or more connections and the two or more nodes to identify the one or more predicted connections.

In response to determining that the subsequent release of the graph has been received, the method can include placing one or more nodes included in the subsequent release of the graph into the two or more groups of the nodes. The method also can include applying a predicted link threshold operation to the predicted connections to limit a number of predicted connections taken into account during the grouping of the two or more nodes. According to various embodiments, applying the predicted link threshold operation includes applying at least one threshold algorithm to the predicted connections, the at-least-one threshold algorithm including one or more of a global threshold algorithm, a local threshold algorithm, or an adaptive-local threshold algorithm. Grouping the two or more nodes into two or more groups of nodes can include applying a grouping condition to the two or more nodes, the grouping condition including one or more of a prediction-based condition or a grouping density condition.

According to various embodiments, the graph includes social networking data received from a social networking server. In some embodiments, the two or more nodes correspond to two or more users of an online social network.

According to another aspect, a system for anonymizing data over multiple temporal releases is provided. The system includes a processor for executing computer-executable instructions stored in a memory, the execution of which cause the system to perform a method. The method includes receiving a graph relating to a temporal release of data, the graph including two or more nodes and one or more connections between at least two of the two or more nodes; applying a connection prediction model to the graph to identify one or more predicted connections between the two or more nodes; grouping the two or more nodes into two or more groups of nodes; publishing an anonymized version of the graph, the anonymized version of the graph including the two or more groups of nodes and a list identifying each of the two or more nodes in each of the two or more groups of nodes; and determining if a subsequent release of the graph has been received. The method performed by the system further can include in response to determining that the subsequent release of the graph has been received, placing one or more nodes included in the subsequent release of the graph into the two or more groups of the nodes.

According to some embodiments, applying the connection prediction model includes applying the connection prediction model to the one or more connections and the two or more nodes to identify the one or more predicted connections, where the connection prediction model includes one or more of a friend-of-a-friend model, a common neighbors model, a preferential attachment model, or an Adamic-Adar model. The method further can include applying a predicted link threshold operation to the predicted connections to limit a number of predicted connections taken into account during the grouping of the two or more nodes.

In some embodiments, grouping the two or more nodes into two or more groups of nodes includes applying a grouping condition to the two or more nodes, the grouping condition including one or more of a prediction-based condition or a grouping density condition. According to various embodiments, the graph includes data corresponding to a communications network, and the two or more nodes may correspond to users of the communications network.

According to another aspect, a computer-readable storage medium includes computer-executable instructions, executable by an anonymization engine to provide a method for anonymizing data over multiple temporal releases. The method can include receiving a graph relating to a temporal release of data, the graph including two or more nodes and one or more connections between at least two of the two or more nodes; applying a connection prediction model to the graph to identify one or more predicted connections between the two or more nodes; grouping the two or more nodes into two or more groups of nodes; publishing an anonymized version of the graph, the anonymized version of the graph including the two or more groups of nodes and a list identifying each of the two or more nodes in each of the two or more groups of nodes; and determining if a subsequent release of the graph has been received.

According to some embodiments, the method further includes placing one or more nodes included in the subsequent release of the graph into the two or more groups of the nodes in response to determining that the subsequent release of the graph has been received. According to some embodiments, the method further includes applying a predicted link threshold operation to the predicted connections to limit a number of predicted connections taken into account during the grouping of the two or more nodes.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for anonymizing data over multiple temporal releases. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
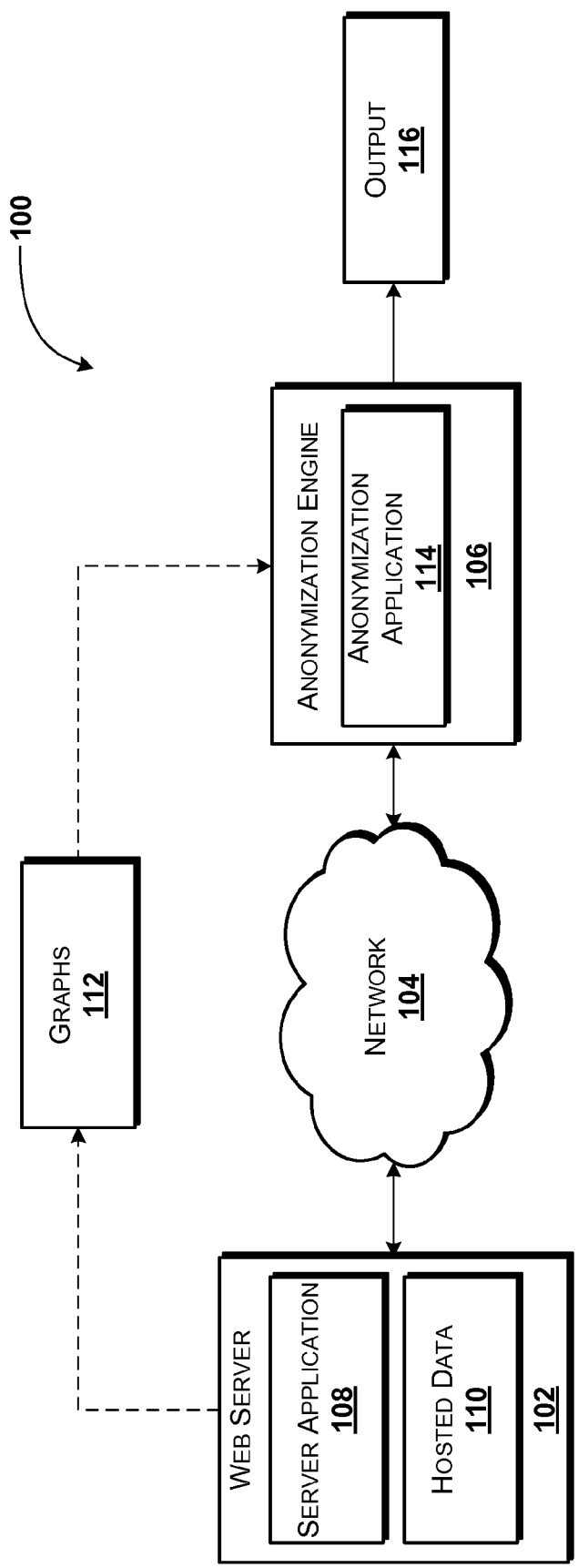
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a Web server 102. According to various embodiments, the functionality of the Web server 102 described herein may be provided by one or more server computers, desktop computers, mobile telephones, laptop computers, other computing systems, and the like. The Web server 102 can be configured to operate on or in communication with a network 104. An exemplary network 104 is described in detail below with reference to FIG. 5. The Web server 102 also can be configured to communicate with an anonymization engine 106 via the network 104 and/or via a direct link.

As illustrated in FIG. 1, the Web server 102 executes a server application 108 for providing one or more services to users or entities connected to the Web server 102. For example, in some embodiments, the Web server 102 corresponds to a social networking server configured to provide a social networking service via execution of a social networking application. Generally speaking, the server application 108 interfaces with one or more users or other entities to enable creation, maintenance, modification, and/or deletion of hosted data 110, such as social networking data, stored or hosted by Web server 102. The hosted data 110 can include data stored in almost any format, and can be modified at almost any time by any number of users or other entities. In some embodiments, for example, the hosted data 110 relates to a social networking service and can be modified by any number of users of the social networking service. As will be explained in more detail herein, the hosted data 110 may be released or published a number of times. The hosted data 110 or portions thereof may be released as one or more graphs 112, as described herein.

The anonymization engine 106 is configured to provide the functionality described herein for anonymizing data over multiple temporal releases. The anonymization engine 106 is configured to execute one or more application programs such as, for example, an anonymization application 114 and/or other application programs. The application programs are executable programs configured to provide the functionality described herein.

As will be explained in more detail below with reference to FIGS. 2A-2C and 3, the anonymization application 114 is configured to receive a graph 112, and/or other data relating to the hosted data 110. The anonymization application 114 analyzes the graph 112, identifies current and predicted connections between nodes in the graph 112, groups and anonymizes the nodes based upon the current and predicted connections, and outputs or publishes the anonymized information as output 116. The anonymization application 114 is configured to use the same anonymization and grouping methods applied to nodes of a first temporal release of the graph 112 to anonymize future temporal releases of the graph 112. Thus, as will be explained in more detail below, multiple temporal releases of the graph 112 can be released without compromising private information associated with one or more users or entities represented in the graph 112. In some embodiments, the anonymization application 114 generates the output 116 as anonymized information from the graph 112, one or more groups of nodes, and/or other data relating to anonymized information from the graph 112.

FIG. 1 illustrates one Web server 102, one network 104, and one anonymization engine 106. It should be understood, however, that some implementations of the operating environment 100 include multiple Web servers 102, multiple networks 104, and multiple anonymization engines 106. Therefore, the illustrated embodiment should be understood as being exemplary, and should not be construed as being limiting in any way.

Figure 2A:
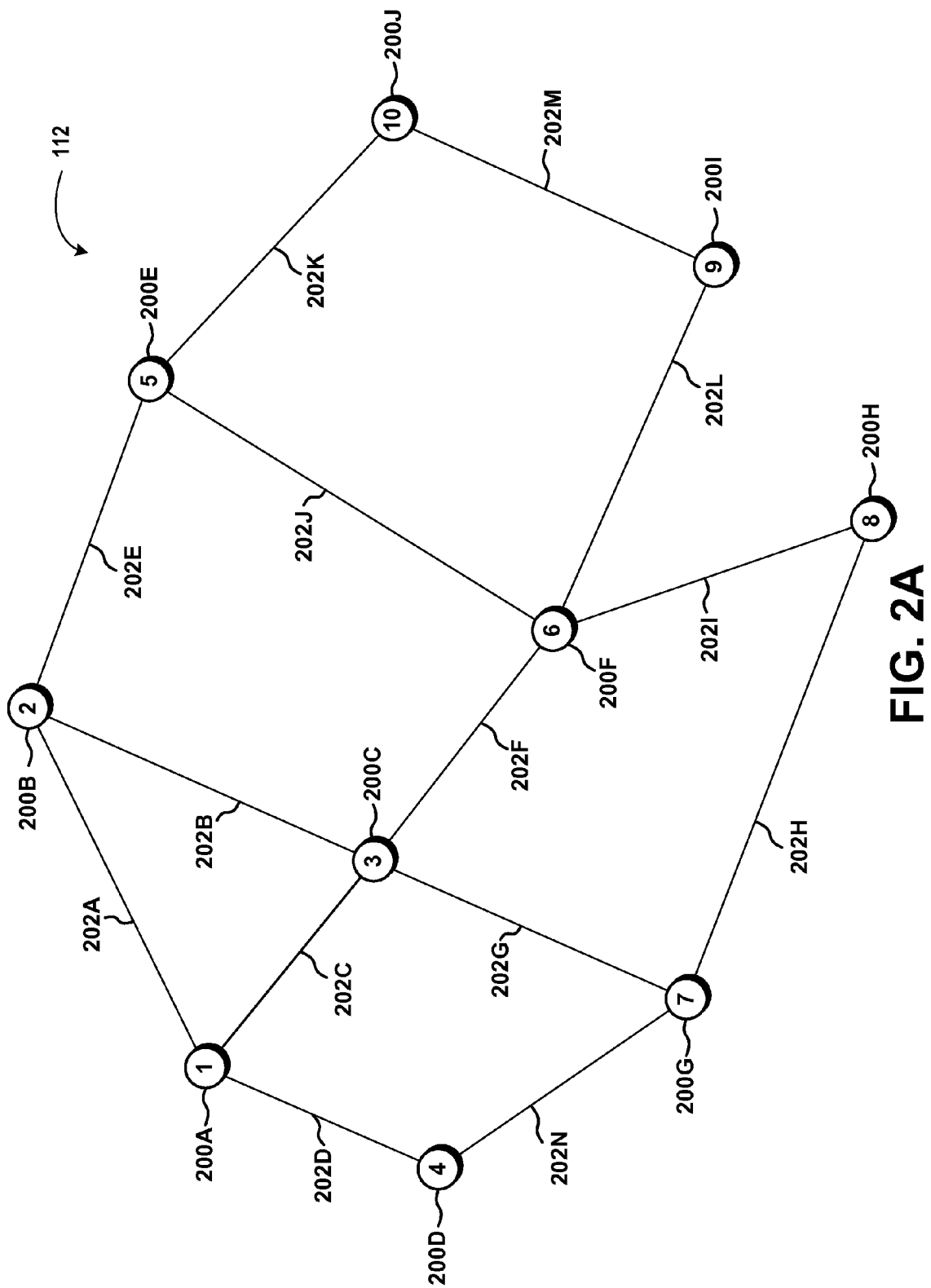
FIGS. 2A-2C are block diagrams schematically illustrating various aspects of a graph, according to an exemplary embodiment.
Figure 2B:
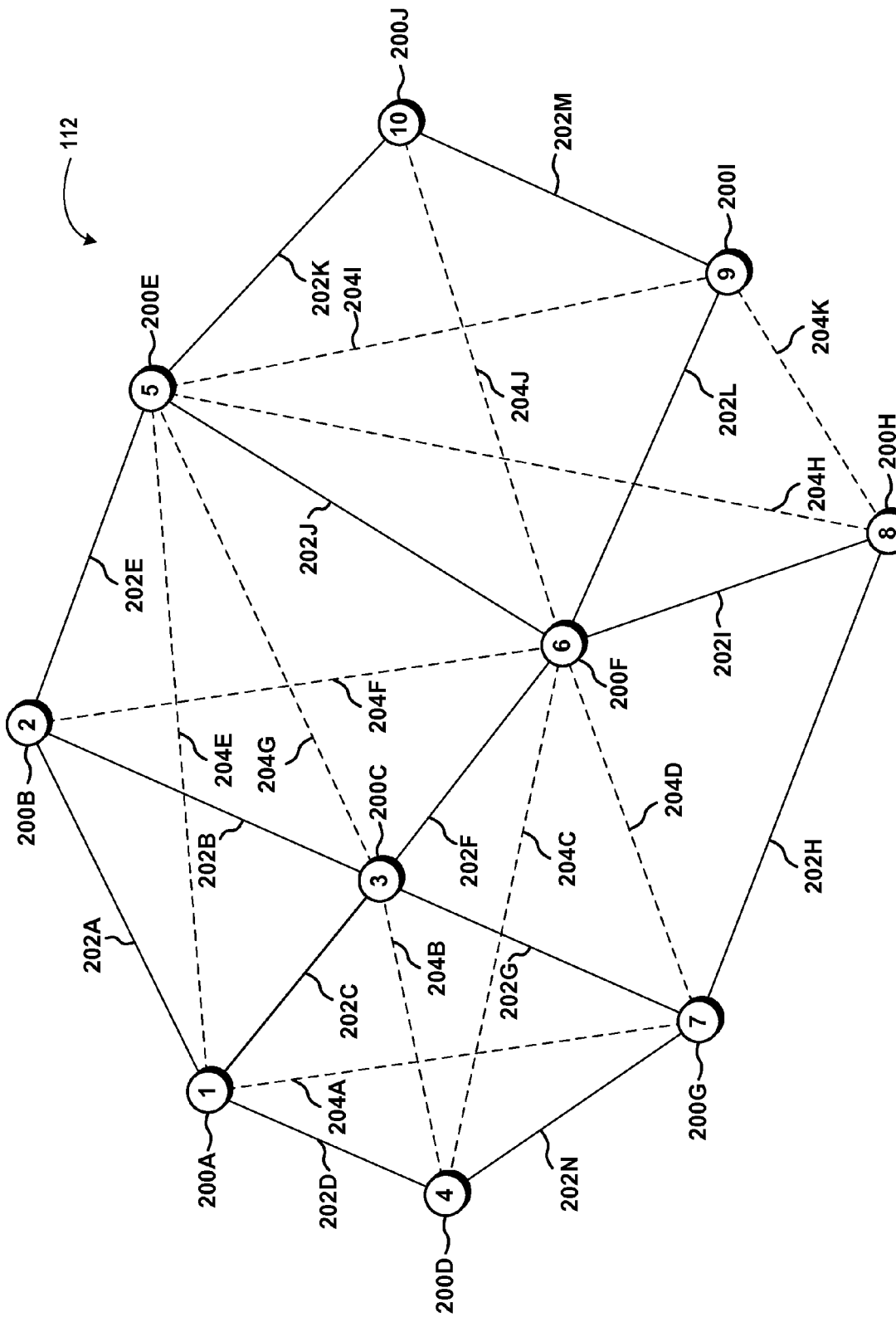
Figure 2C:
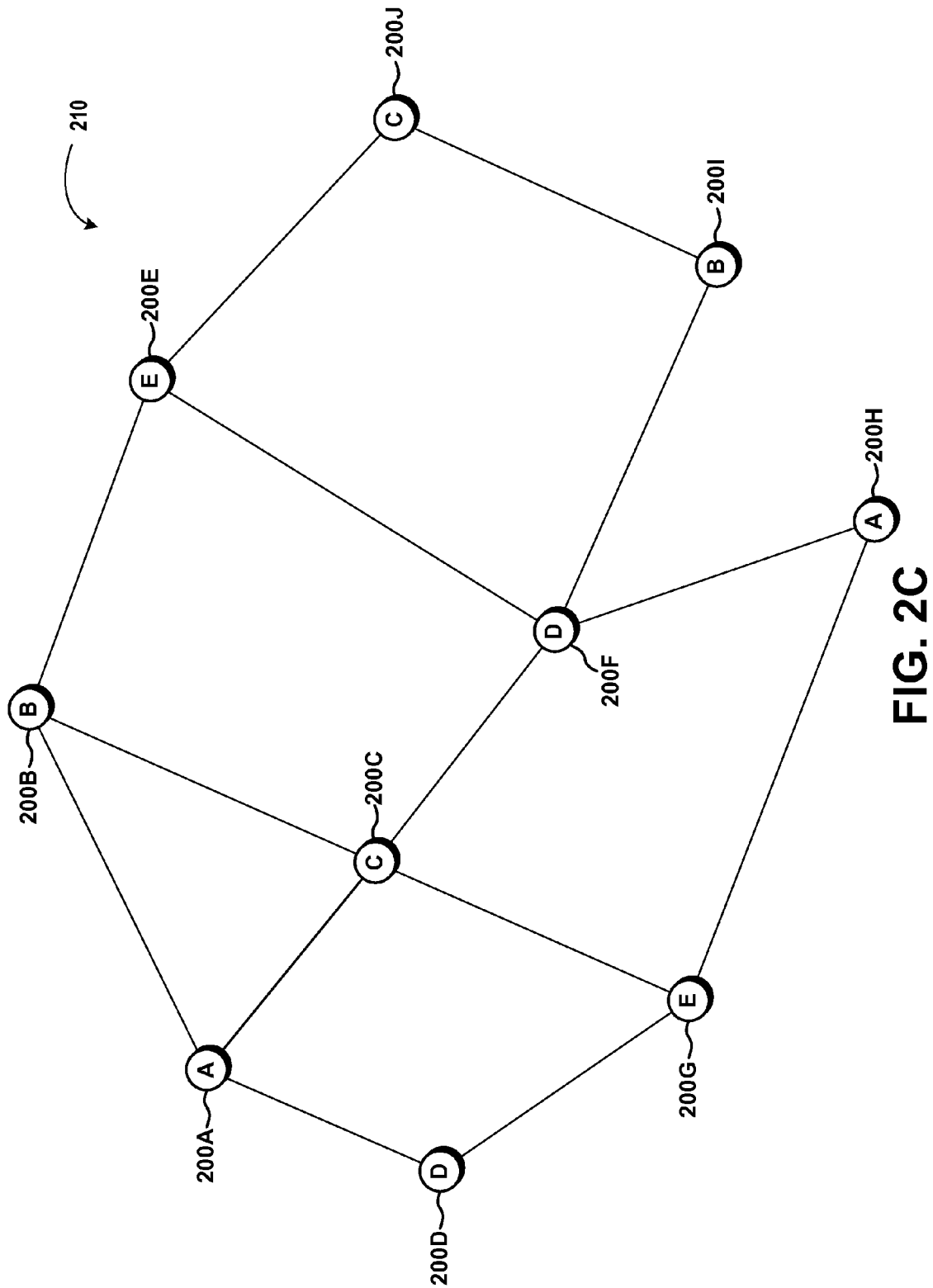

Turning now to FIGS. 2A-2C, additional aspects of the graph 112 are described, according to exemplary embodiments. The graph 112 illustrated in FIG. 2A includes ten nodes 200A-200J, hereinafter collectively referred to as the nodes 200. According to various exemplary embodiments, each of the nodes 200 corresponds to a user of a social networking service, of network services, of an organization, and/or another network. For purposes of illustration, the graph 112 is described as relating to a social networking service. This embodiment is exemplary, and should not be construed as being limiting in any way.

In the illustrated graph 112, each of the nodes 200 is numbered with a number between one and ten. The illustrated numbers indicate an exemplary user to whom the respective nodes 200 correspond. Thus, the node 200A corresponds to a user, "User1," the node 200B corresponds to "User2," and so forth. The graph 112 also illustrates a number of connections 202A-202N hereinafter collectively referred to as the connections 202 or generically as the connection 202. The connections 202 illustrate communication or network connections between the users corresponding to the nodes 200. In the graph 112 illustrated in FIG. 2A, User1, the user corresponding to the node 200A, is connected to User2, User3, and User4, which respectively are denoted by the nodes 200B, 200C, and 200D. It should be understood that this example is illustrative, and should not be construed as being limiting in any way.

It will be appreciated that if the graph 112 or data relating thereto is released to a recipient, that the recipient may be able to ascertain private information relating to the users associated with the graph 112. In particular, the graph 112 reveals how the nodes 200 are connected to one another, which may be considered private information by one or more users associated with the nodes 200. Therefore, it may be desirable, in some embodiments, to anonymize the graph 112 and/or data relating thereto, prior to releasing the graph 112. In some embodiments, the graph 112 is anonymized according to the known nodes 200 and connections 202 at any particular time. According to other embodiments, the graph 112 is anonymized based upon an analysis that is performed to identify the predicted connections between the nodes 200 of a graph 112.

FIG. 2B illustrates a predicted graph 112', according to an exemplary embodiment. The illustrated predicted graph 112' corresponds to an analyzed version of the graph 112 illustrated in FIG. 2A, and illustrates a number of predicted connections 204A-204K, hereinafter collectively referred to as the predicted connections 204 or generically as the predicted connection 204. The predicted connections 204 are connections that the anonymization engine 106 predicts will exist at some future time.

In the example illustrated in FIG. 2B, the nodes 200A and 200E are not connected to one another when the graph 112 shown in FIG. 2A is released. As shown in FIG. 2B, however, the anonymization engine 106 predicts that the nodes 200A and 200E will be connected to one another at some future time, as reflected by the predicted connection 204E. This example is illustrative, and should not be construed as being limiting in any way. According to various embodiments, the anonymization engine 106 applies one or more prediction models to the graph 112 to predict the connections, some of which are described herein.

In some embodiments, for example, the anonymization engine 106 applies a friend-of-a-friend ("FOAF") model to the graph 112 to determine the predicted connections 204. The FOAF model examines each node 200, and generates the predicted connections 204 for any nodes 200 that are within two connections of the examined node 200. With reference to FIG. 2B, because the node 200A is connected to the node 200B, and because the node 200B is connected to the node 200E, the FOAF model may predict a predicted connection 204E between the node 200A and the node 200E. It should be understood that this embodiment is exemplary, and that the illustrated predicted graph 112' of FIG. 2B is not necessarily derived using the FOAF model.

Formally, the FOAF model predicts the predicted connections 204 as follows. Considering three nodes 200, referred to herein as the nodes u, v, and z, wherein the nodes u and v are connected to one another, and the nodes v and z are connected to one another, a predicted connection 204, referred to herein as $\tilde{E}$ at time t, i.e., $E_{\tilde{t}}$ is predicted as follows: $\forall u, v, z \in V_t$: $(u,v)(v,z) \in E_t \Rightarrow (u,z) \in \tilde{E}_t$, wherein $V_t$ are a set of the nodes 200 at time t, and $E_t$ are the connections 202 at time t. The FOAF model treats each predicted connection 204 as equally likely to appear.

In other embodiments, the anonymization engine 106 applies a common neighbors ("CN") model to the graph 112 to generate the predicted connections 204. The CN model assumes that when there are many common neighbors of two nodes 200, that the two nodes 200 with the many common neighbors are likely to become connected to one another. The number of connections 202 that are observed to trigger the assumption of the CN model that two nodes 200 will be linked is a matter of design choice. It should be understood that the CN model may generate the same predicted connections 204 as the FOAF model, but the CN model may apply a weight to each of the predicted connections 204. The predicted connections 204 between the nodes 200 with many common neighbors are weighted comparatively higher, relative to the predicted connections 204 between the nodes 200 without many common neighbors. More precisely, the CN model assigns weights $\tilde{W}$ follows: $\tilde{W}_t(u,z)=|v \in V_t:(u,v),(v,z) \in E_t|$, wherein $V_t$ are a set of the nodes 200 at time t, and $E_t$ are the connections 202 at time t.

In other embodiments, the anonymization engine 106 applies an Adamic-Adar ("AA") model to the graph 112 to generate the predicted connections 204. The AA model essentially extends the FOAF and CN models by treating predicted connections 204 with high weights $\tilde{W}_t$, relative to other predicted connections 204 with comparatively lower weights $\tilde{W}_t$, as being more significant. The AA model assigns a weight $\tilde{W}_t$ to a predicted connection 204 between nodes u and z as $$\tilde{W}_t(u,z) = \sum_{v \in V_t:(u,v),(v,z) \in E_t} \frac{1}{\log(deg(v))},$$

wherein $V_t$ are a set of the nodes 200 at time t, and $E_t$ are the connections 202 at time t. The AA model generates the same predicted connections 204 as the FOAF and CN models, but may apply a finer gradation of the weights $\tilde{W}_t$ than those generated with the CN model.

In yet other embodiments, the anonymization engine 106 applies a preferential attachment ("PA") model to the graph 112 to generate the predicted connections 204. The PA model assumes that connections are more likely between nodes 200 with a higher degree than between nodes 200 with a comparatively lower degree. More particularly, the PA model generates a predicted connection 204 between two nodes 200 and assigns a weight $\tilde{W}_t$ to the predicted connection 204. For exemplary nodes 200, referred to herein as the nodes u and z, the PA model generates a predicted connection 204 and assigns a weight $\tilde{W}_t$ as $\tilde{W}_t(u,z)=deg(u) \cdot deg(z)$, wherein deg(u) is the degree of the node u, and deg(z) is the degree of the node z. Because the PA model generates predicted connections 204 between all nodes 200 of the graph 112, thresholding of the weights assigned to the predicted connections 204 may be applied to restrict which of the predicted connections 204 are considered based upon their respective weights exceeding or not meeting one or more threshold weight values, if desired.

FIG. 2C illustrates an anonymized graph 210, according to an exemplary embodiment. The anonymized graph 210 is anonymized using what is referred to herein as the full list approach to anonymization. In applying the full list approach to anonymization, each node 200 is put into a group of nodes, and the group of nodes is associated with a list of identities associated with the group of nodes. In the illustrated example, the nodes 200A and 200H have been put into a group, Group A, which may be associated with a list identifying the two nodes 200A and 200H. Because the nodes 200A and 200H are associated with a list of possible nodes 200, and not explicitly disclosed, a recipient of the anonymized graph 210 and list of possible nodes 200 will be unsure whether, for example, the node 200A relates to User1 or User8. It should be understood that the number of possible identities of nodes 200, as well as the number of nodes 200 in a group of nodes 200 can be almost of any size, and is not limited to two nodes 200 or two possible identities as provided in FIG. 2C.

While the full list method of anonymization may be fairly effective for a single release of the graph 112, multiple temporal releases of the graph 112 may provide additional information that can allow recipients of the graph 112 to identify one or more users associated with the nodes 200. To illustrate this problem, consider an exemplary graph 112 that is published at a first time $t_1$. At the first time $t_1$, one of the nodes 200 is published with a first list of possible identities that identifies a user or entity associated with the node 200. At the first time $t_1$, the first list of possible identities includes the actual name or identity of a user or entity associated with a group of nodes 200. For example, the names $u_1$, $u_2$, $u_3$, may be provided in the list of possible identities, but only one of the names actually correctly identifies the node 200. At a second time $t_1+1$, the node 200 is again published, this time with a second list of possible identities. At the second time $t_1+1$, the second list of possible identities includes the names $u_1$, $u_4$, and $u_5$, only one of which correctly identifies the node 200.

In this simple example, a recipient of the graph 112 can easily deduce across the multiple temporal releases that the correct identity of the node 200 is $u_1$. Thus, a graph 112 that is published via two or more temporal releases may be analyzed in a way such that desired levels of node privacy and/or connection privacy are violated. According to various embodiments of the concepts and technologies disclosed herein, a grouping of nodes 200 applied to a first temporal release of the graph 112 is retained and applied to future temporal releases of the graph 112, thereby avoiding the violation of node privacy and/or connection privacy in the manner set forth in the above example. Exemplary methods for applying a grouping of nodes 200 across multiple temporal releases of the graph 112 are described in more detail below with reference to FIG. 3.

Figure 3:
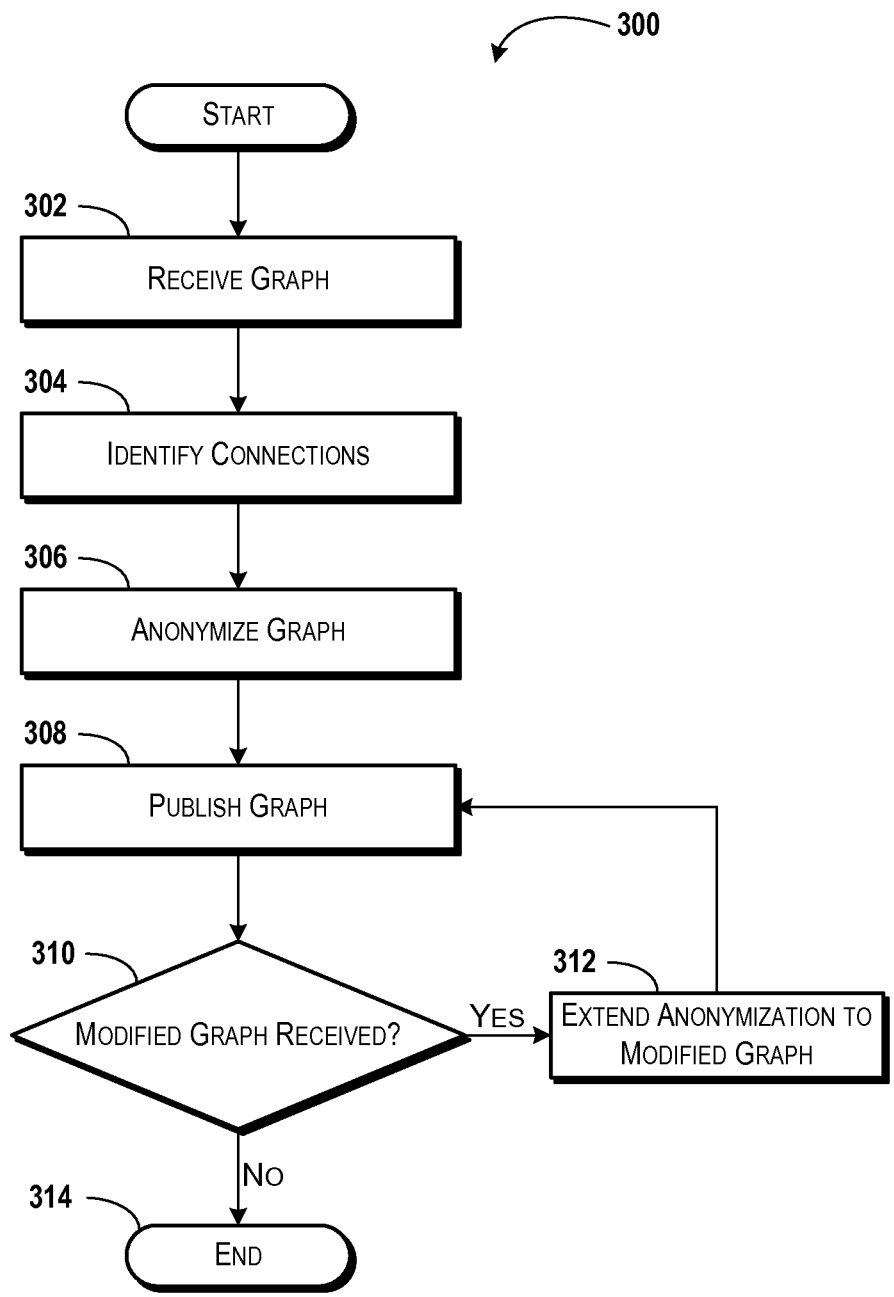
FIG. 3 is a flow diagram showing aspects of a method for anonymizing data over multiple temporal releases, according to an exemplary embodiment.

Turning now to FIG. 3, aspects of a method 300 for anonymizing data over multiple temporal releases will be described in detail. It should be understood that the operations of the method 300 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the anonymization engine 106. It should be understood that these embodiments are exemplary, and should not be viewed as being limiting in any way. The method 300 begins at operation 302, wherein the anonymization engine 106 receives the graph 112. As explained above, the graph 112 can be received from the Web server 102, a database, and/or one or more other devices, servers, or data storage devices, any or all of which can be in communication with the anonymization engine 106 and/or otherwise accessible to or by the anonymization engine 106.

In some embodiments, the anonymization engine 106 queries the Web server 102 or another device for the graph 112. The Web server 102 responds to the query by transmitting the graph 112 to the anonymization engine 106. In other embodiments, the Web server 102 is configured to periodically transmit the graph 112 to the anonymization engine 106 based upon one or more of an interval of time passing between transmissions, a time of day, a day of the week, a day of the month, combinations thereof, and the like. In still other embodiments, the Web server 102 is configured to transmit the graph 112 after changes are made to the hosted data 110 stored at the Web server 102. These embodiments are exemplary and should not be construed as being limiting in any way.

From operation 302, the method 300 proceeds to operation 304, wherein the anonymization engine 106 identifies connections 202 and predicted connections 204 between the nodes 200 of the graph 112. The identity of the nodes 200 and the connections 202 between the nodes 200 can be determined by the anonymization engine 106 directly from the graph 112. With respect to the predicted connections 204, the anonymization engine 106 applies one or more connection prediction models to the graph 112 to identify predicted connections 204 between the nodes 200.

More particularly, the anonymization engine 106 generates the predicted connections 204 that are expected to exist in a future temporal release of the graph 112, as set forth above with respect to operation 304. At time t the anonymization engine 106 applies a connection prediction model to predict a future temporal release of the graph 112, which includes the nodes 200, the connections 202, and the predicted connections 204. According to various embodiments, the anonymization engine 106 applies one or more of the exemplary connection prediction models described above with reference to FIG. 2B.

From operation 304, the method 300 proceeds to operation 306, wherein the anonymization engine 106 anonymizes the graph 112. Although not separately illustrated in FIG. 3, the operation 306 can include grouping the nodes based upon the identified connections 202 and the identified predicted connections 204. According to various embodiments, the anonymization engine 106 chooses a grouping of the nodes 200 and publishes the graph 112 using the chosen grouping. The anonymization engine 106 uses the predicted future temporal release of the graph 112 to generate groups used to anonymize the graph 112.

In doing so, the anonymization engine 106 respects a safety condition (explained below) for the combination of the previously observed connections 202 and additionally uses information about the predicted connections 204 to further guide the grouping process. The prediction model used to generate the groups can be determined based upon preferences, settings, design requirements, and the like. It should be noted that the anonymization engine 106 does not predict the arrival of new nodes 200, as these nodes 200 can be grouped upon arrival.

In the case of a single graph 112, a formal safety condition can be expressed as $\forall v_1 \in S_1, w_1, w_2 \in S_2 (v_1, w_1), (v_1, w_2) \in E \Rightarrow w_1 = w_2$. The safety condition is applied to the graph 112 to ensure a sparsity of interaction between the nodes 200. The safety condition also holds recursively if the groups of the nodes 200 are partitioned. Some connection prediction models may generate a large number of predicted connections 204. Thus, merely extending the safety condition used for the graph 112 to the dynamic setting, i.e., to the predicted graph 112', may not yield correct results.

More particularly, because of the large number of predicted connections 204 often present in the predicted graph 112', there may be no safe grouping of the nodes 200 that satisfies constraints introduced by the predicted connections 204. In various embodiments disclosed herein, the anonymization engine 106 uses a prediction-based condition to group the nodes 200 instead of the above-disclosed safety condition. According to various embodiments, the prediction-based condition states that a grouping of the nodes 200 satisfies the prediction-based condition if $\forall v_1 \in S_1, w_1, w_2 \in S_2 : (v_1, w_1) \in E_t \wedge (v_1, w_2) \in (E_t \cup \tilde{E}_t) \Rightarrow w_1 = w_2$. Thus, a grouping of the nodes 200 satisfies the prediction-based condition if there are two nodes 200 in a group that do not share a connection 202 and/or if there is no path of length two between the two nodes 200 with one or fewer predicted connections 204.

Referring again to FIG. 2B, differences between the safety condition and the prediction-based condition can be understood more easily. For example, if the safety condition is applied to the predicted graph 112', the nodes 200A and 200J may be placed in the same group. If the prediction-based condition is applied to the predicted graph 112', however, the nodes 200A and 200J will not be placed in the same group, because the node 200J is only one existing connection 202K and one predicted connection 204E away from 200J, which fails to satisfy the predicted-based condition.

According to other embodiments, the anonymization engine 106 applies a grouping density condition to the predicted graph 112' to anonymize the graph 112. The grouping density condition restricts the groups of nodes 200 based upon interactions between the groups of nodes 200. The anonymization engine 106 may determine that a grouping of the nodes 200 satisfies the group density condition if for every pair of groups $(S_1, S_2)$, the density of the connections 202 and/or the predicted connections 204 between the nodes 200 in $S_1$ and the nodes 200 in $S_2$ is between zero and one. It will be understood that a grouping of the nodes 200 that violates the prediction-based condition still may be allowable in accordance with the group density condition.

As mentioned above, new nodes of subsequent temporal releases of the graph 112 can be grouped as they are identified. Upon receiving one or more subsequent temporal releases of the graph 112, the anonymization engine 106 can be configured to extend the grouping chosen for the graph 112 to the future releases of the graph 112, which may be published using the extended grouping. According to embodiments, the anonymization engine 106 determines a grouping that complies with a desired grouping condition when temporal releases of the graph 112 are received. The anonymization engine 106 examines each new node 200 in turn, and inserts the new node 200 into the first group of size less than k created at time t, so that the newly formed group satisfies the grouping condition, whether based upon the prediction-based condition or the group density condition.

If the anonymization engine 106 does not identify such a group, a new group can be created, initially containing the new node 200 alone, which by definition satisfies either grouping condition. At the end of the procedure, any nodes 200 in groups of size less than k can be merged into other groups created at time t to form groups of size k+1. When using anonymized graphs 112, it may be preferable to have entities with similar attributes grouped together, provided the grouping conditions are still met. Thus, the anonymization engine 106 is configured to preferentially group nodes 200 by considering the nodes 200 in an order that corresponds to their respective attributes.

As explained above, the connection prediction models can generate a large number of predicted connections 204. For example, the PA model generates predicted connections 204 between all of the nodes 200, and assigns a weight to those predicted connections 204. Therefore, finding a grouping that meets one of the grouping conditions, which enforce local sparsity, may be difficult or even impossible if all connections 202 and predicted connections 204 of a graph 112 are considered as equal. Therefore, the anonymization engine 106 is configured in some embodiments to apply thresholding to the predicted connections 204 to select a subset of the predicted connections 204.

In some embodiments, the anonymization engine 106 applies a global threshold (GT) algorithm to the predicted graph 112' to pick a number of the most heavily weighted predicted connections 204. In other embodiments, the anonymization engine 106 applies a local threshold (LT) algorithm to the predicted graph 112' to pick a number of the predicted connections 204 at each node that have the highest weight. In yet other embodiments, the anonymization engine 106 applies an adaptive-local threshold (ALT) algorithm to the predicted graph 112' to pick the top f(deg(v)) predicted connections 204, where f(deg(v)) is a function of the current degree deg(v) of an analyzed node 200. It should be understood that the function can be linear, logarithmic, and/or set based on observed historic behavior of growth of the analyzed node 200.

From operation 306, the method 300 proceeds to operation 308, wherein the anonymization engine 106 publishes the graph 112. As explained above with reference to FIG. 1, the anonymization engine 106 can generate the output 116, which can include the graph 112 and the determined groups as determined in operation 306. The output 116 can be published to a server, a Web site, a data storage device, a database, or to another data storage location.

From operation 308, the method 300 proceeds to operation 310, wherein the anonymization engine 106 determines if a subsequent release of the graph 112 has been received. As mentioned above, a subsequent release of the graph 112 can be received at almost any time. If a subsequent release of the graph 112 has been received by the anonymization engine 106, the method 300 proceeds to operation 312, wherein the anonymization engine extends the groups determined in operation 306 to the subsequent release of the graph 112. If the anonymization engine 106 determines in operation 310 that a subsequent release of the graph 112 has not been released, the method 300 proceeds to operation 314, where the method 300 ends.

Figure 4:
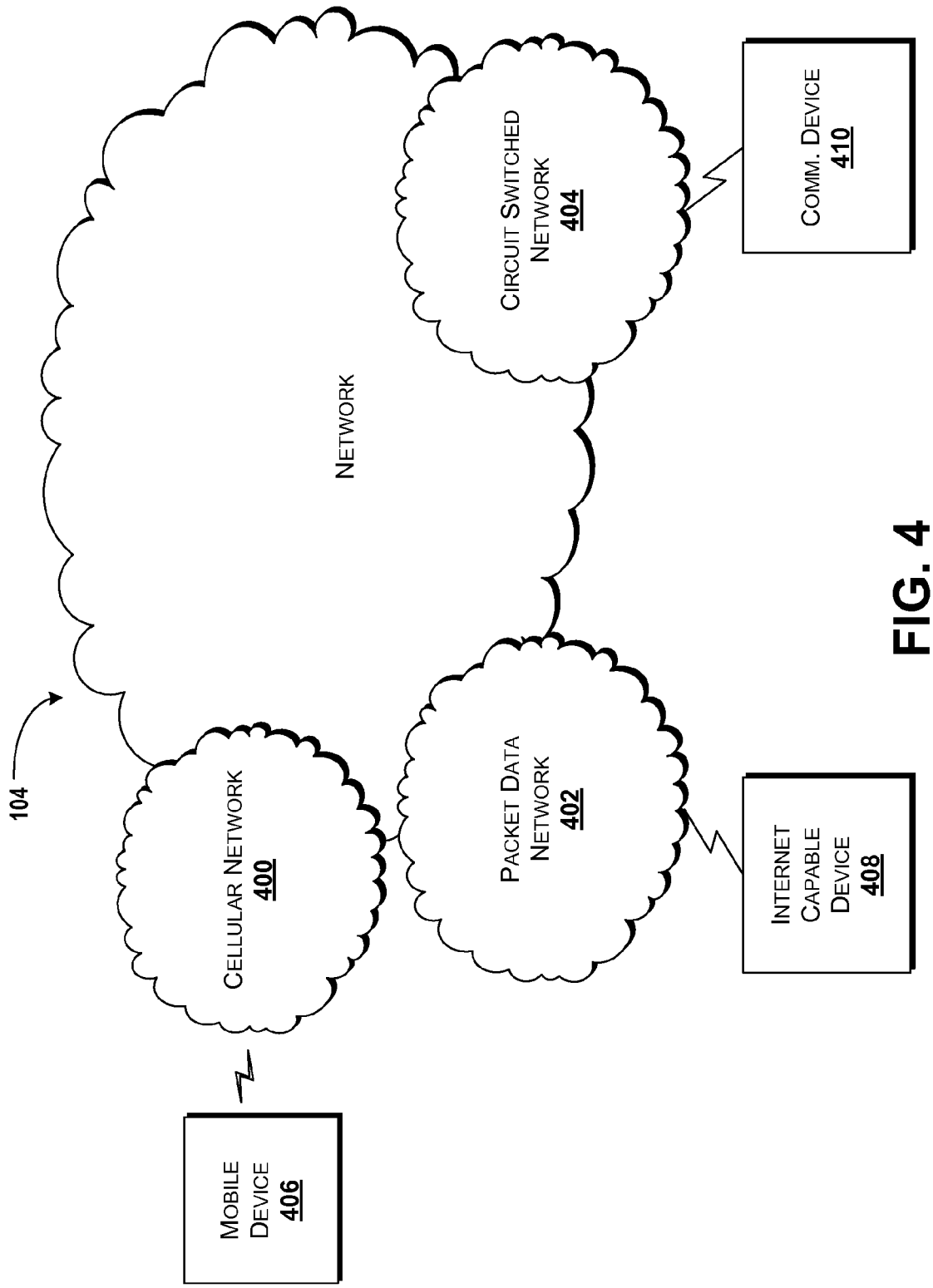
FIG. 4 schematically illustrates a network, according to an exemplary embodiment of the present disclosure.

Turning now to FIG. 4, an exemplary network 104 is illustrated, according to an exemplary embodiment of the present disclosure. The network 104 includes a cellular network 400, a packet data network 402, for example, the Internet ("Internet"), and a circuit switched network 404, for example, a publicly switched telephone network ("PSTN"). The cellular network 400 includes various components such as, but not limited to, base transceiver stations ("BTSs"), Node-B's, base station controllers ("BSCs"), radio network controllers ("RNCs"), mobile switching centers ("MSCs"), short message service centers ("SMSCs"), multimedia messaging service centers ("MMSCs"), home location registers ("HLRs"), visitor location registers ("VLRs"), charging platforms, billing platforms, voicemail platforms, GPRS core network components, location service nodes, an Internet protocol multimedia subsystem ("IMS"), and the like. The cellular network 400 also includes radios and nodes for receiving and transmitting voice, data, and combinations thereof to and from radio transceivers, networks, the Internet 402, and the PSTN 404.

A mobile communications device 406, such as, for example, a cellular telephone, a user equipment, a mobile terminal, a PDA, a laptop computer, a handheld computer, and combinations thereof, can be operatively connected to the cellular network 400. The cellular network 400 can be configured as a 2G GSM ("Global System for Mobile communications") network, and can provide data communications via GPRS ("General Packet Radio Service") and connection ("Enhanced Data rates for GSM Evolution"). Additionally, the cellular network 400 can be configured as a 3G UMTS ("Universal Mobile Telecommunications System") network and can provide data communications via the HSPA ("High-Speed Packet Access") protocol family, for example, HSDPA ("High-Speed Downlink Packet Access"), EUL ("Enhanced Uplink") or otherwise termed HSUPA ("High-Speed Uplink Packet Access"), and HSPA+("Evolved HSPA"). The cellular network 400 also is compatible with 4G mobile communications standards.

The Internet 402 includes various devices, for example, servers, computers, databases, and other devices in communication with another, as is generally known. The Internet 402 devices are accessible via one or more network links. The servers often store various files that are provided to a requesting device such as, for example, a computer, a terminal, a smart phone, or the like. Typically, the requesting device includes software (a "browser") for executing a Web page in a format readable by the browser or other software. Other files and/or data may be accessible via "links" in the retrieved files, as is generally known. The PSTN 404 includes various hardware and software for providing circuit switched communications. The PSTN 404 may include, or may be, what is often referred to as a plain old telephone system ("POTS"). The functionality of a PSTN 404 or other circuit-switched network is generally known and will not be described herein in detail.

The illustrated cellular network 400 is shown in communication with the Internet 402 and a PSTN 404, though it should be appreciated that this is not necessarily the case. One or more Internet-capable devices 408, for example, a PC, a laptop, a portable device, the device 406, a smart phone, or any other suitable device, can communicate with one or more cellular networks 400, and devices 406 connected thereto, through the Internet 402. It also should be appreciated that the Internet-capable device 408 can communicate with the Internet 402 through the PSTN 404, the cellular network 400, and/or via other networks (not illustrated). As illustrated, a communications device 410, for example, a telephone, facsimile machine, modem, computer, or the like, can be in communication with the PSTN 404, and therethrough to the Internet 402 and/or the cellular network 400. It should be appreciated that the communications device 410 can be an Internet-capable device, and can be substantially similar to the Internet-capable device 408. In the specification, the network 104 is used to refer broadly to any combination of the networks 400, 402, 404. It should be appreciated that substantially all of the functionality described with reference to the network 104 can be performed by the cellular network 400, the Internet 402, and/or the PSTN 404, alone or in combination with other networks, network elements, and the like.

Figure 5:
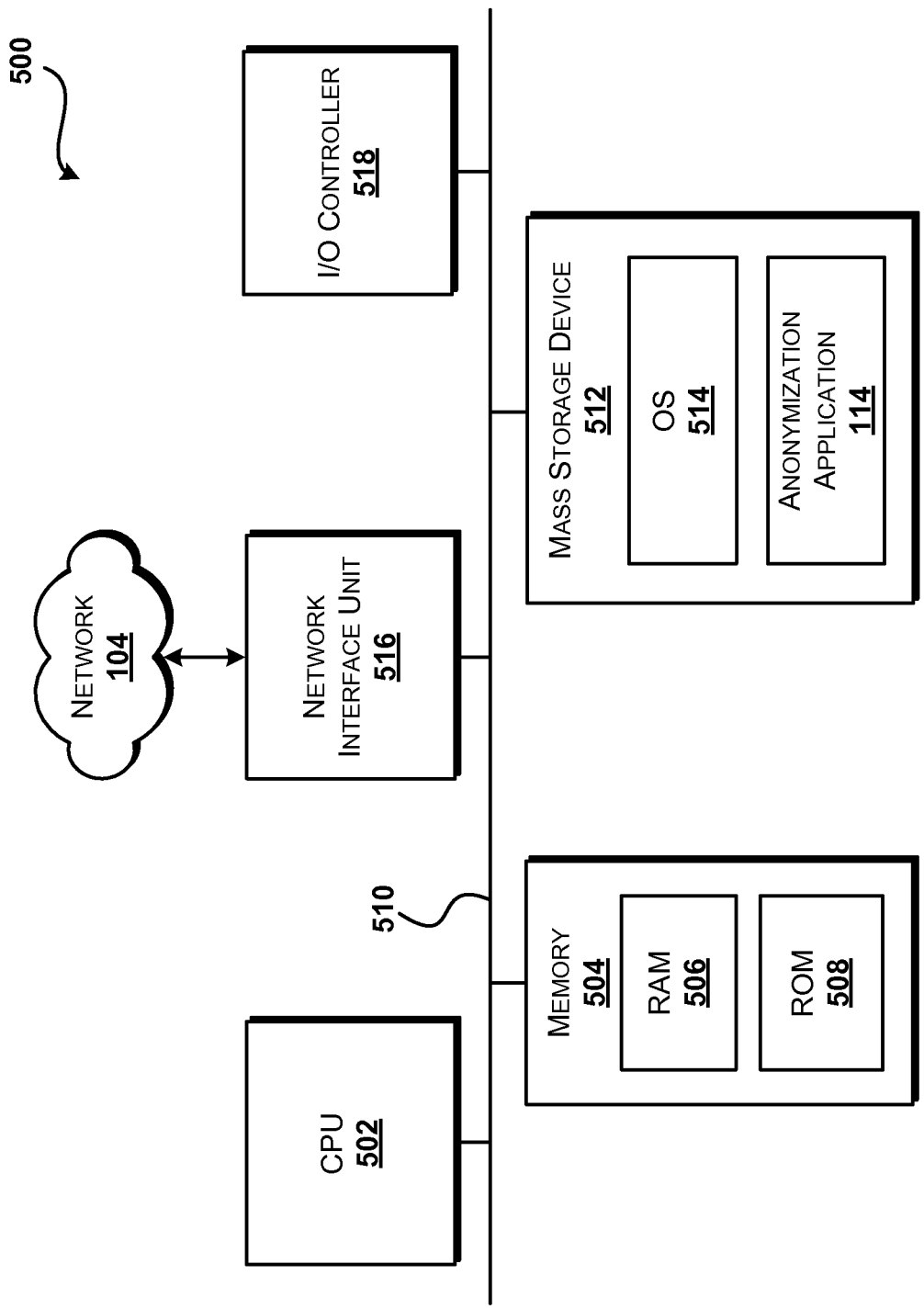
FIG. 5 is a computer architecture diagram illustrating an exemplary computer hardware and software architecture for a computing system capable of implementing aspects of the embodiments presented herein.

FIG. 5 illustrates an exemplary computer architecture 500 for a device capable of executing the software components described herein for anonymizing data over multiple temporal releases. Thus, the computer architecture 500 illustrated in FIG. 5 illustrates an architecture for a server computer, mobile phone, a PDA, a smart phone, a server computer, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514 and the anonymization application 114. The mass storage device 512 also can be configured to store one or more graphs 112.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of this specification and the claims, the phrase "computer-readable storage medium" and variations thereof, does not include waves, signals, and/or other transitory and/or intangible communication media.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems, for example, the Web server 102. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for anonymization of data over multiple temporal releases have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method for anonymizing data over multiple temporal releases of the data, the method comprising:
    receiving a graph at a computer executing an anonymization engine, the graph relating to a temporal release of the multiple temporal releases of the data and comprising a plurality of nodes and connections between at least two of the plurality of nodes;
    applying, by the computer, a connection prediction model to the graph to identify predicted connections between the plurality of nodes;
    grouping, by the computer, the plurality of nodes into groups of nodes;
    publishing, by the computer, an anonymized version of the graph, the anonymized version of the graph comprising the groups of nodes and a list identifying each of the plurality of nodes in each of the groups of nodes;
    determining, by the computer, if a further graph has been received, the further graph comprising additional nodes and relating to a subsequent temporal release of the data;
    in response to determining that the further graph has been received, placing, by the computer, the additional nodes included in the further graph into the groups of the nodes; and
    publishing, by the computer, a further anonymized version of the graph, the further anonymized version of the graph comprising the groups of nodes, the additional nodes, and the list.

2. The method of claim 1, wherein applying the connection prediction model comprises applying a friend-of-a-friend model to the connections and the plurality of nodes to identify the predicted connections, wherein the predicted connections comprise a connection between an analyzed node of the plurality of nodes and another node of the plurality of nodes that is within two connections of the analyzed node.

3. The method of claim 1, wherein applying the connection prediction model comprises applying a common neighbors model to the connections and the plurality of nodes to identify the predicted connections, wherein the predicted connections comprise a connection between an analyzed node of the plurality of nodes and another node of the plurality of nodes that is within two connections of the analyzed node, and wherein each of the predicted connections is assigned a weight based upon a number of common neighbors shared by the analyzed node and the other node.

4. The method of claim 1, wherein applying the connection prediction model comprises applying an Adamic-Adar model to the connections and the plurality of nodes to identify the predicted connections.

5. The method of claim 1, wherein applying the connection prediction model comprises applying a preferential attachment model to the connections and the plurality of nodes to identify the predicted connections.

6. The method of claim 1, further comprising applying a predicted link threshold operation to the predicted connections to limit a number of predicted connections taken into account during the grouping of the plurality of nodes.

7. The method of claim 6, wherein applying the predicted link threshold operation comprises applying at least one threshold algorithm to the predicted connections, the at least one threshold algorithm comprising at least one of a global threshold algorithm, a local threshold algorithm, or an adaptive-local threshold algorithm.

8. The method of claim 1, wherein grouping the plurality of nodes into the groups of nodes comprises applying a grouping condition to the plurality of nodes, the grouping condition comprising at least one of a prediction-based condition or a grouping density condition.

9. The method of claim 1, wherein the graph comprises social networking data received from a social networking server.

10. The method of claim 9, wherein the plurality of nodes correspond to a plurality of users of a social networking service provided by execution of a social networking application by the social networking server.

11. A system comprising:
    a processor; and
    a memory that stores computer-executable instructions that, when executed by the processor, cause the system to perform operations comprising
        receiving a graph relating to a temporal release of multiple temporal releases of data, the graph comprising a plurality of nodes and connections between at least two of the plurality of nodes,
        applying a connection prediction model to the graph to identify predicted connections between the plurality of nodes at a further temporal release of the multiple temporal releases of the data,
        grouping the plurality of nodes into groups of nodes,
        publishing an anonymized version of the graph, the anonymized version of the graph comprising the groups of nodes and a list identifying each of the plurality of nodes in each of the groups of nodes,
        determining if a further graph has been received, the further graph comprising additional nodes and relating to the further temporal release of the data,
        in response to determining that the further graph has been received, placing the additional nodes included in the further graph into the groups of the nodes, and
        publishing a further anonymized version of the graph, the further anonymized version of the graph comprising the groups of nodes, the additional nodes, and the list.

12. The system of claim 11, wherein the graph comprises social networking data received from a social networking server.

13. The system of claim 12, wherein the plurality of nodes correspond to a plurality of users of a social networking service provided by execution of a social networking application by the social networking server.

14. The system of claim 11, further comprising instructions that, when executed by the processor, cause the system to perform operations further comprising applying the connection prediction model to the connections and the plurality of nodes to identify the predicted connections, wherein the connection prediction model comprises one of a friend-of-a-friend model, a common neighbors model, a preferential attachment model, or an Adamic-Adar model.

15. The system of claim 11, further comprising instructions that, when executed by the processor, cause the system to perform operations further comprising applying a predicted link threshold operation to the predicted connections to limit a number of predicted connections taken into account during the grouping of the plurality of nodes.

16. The system of claim 11, further comprising instructions that, when executed by the processor, cause the system to perform operations further comprising grouping the plurality of nodes into the groups of nodes by applying a grouping condition to the plurality of nodes, the grouping condition comprising at least one of a prediction-based condition or a grouping density condition.

17. The system of claim 11, wherein the graph comprises data corresponding to a communications network, and wherein the plurality of nodes correspond to users of the communications network.

18. A computer-readable storage medium comprising computer-executable instructions that, when executed by a processor, cause the processor to perform operations comprising:
   receiving a graph relating to a temporal release of multiple temporal releases of data, the graph comprising a plurality of nodes and connections between the plurality of nodes;
   applying a connection prediction model to the graph to identify predicted connections between the plurality of nodes;
   grouping the plurality of nodes into groups of nodes;
   publishing an anonymized version of the graph, the anonymized version of the graph comprising the groups of nodes and a list identifying each of the plurality of nodes in each of the groups of nodes; and
   determining if a further graph has been received, the further graph comprising additional nodes and relating to a subsequent temporal release of the data;
   in response to determining that the further graph has been received, placing the additional nodes included in the further graph into the groups of the nodes; and
   publishing a further anonymized version of the graph, the further anonymized version of the graph comprising the groups of nodes and the list.

19. The computer-readable storage medium of claim 18, further comprising computer-executable instructions that, when executed by a processor, cause the processor to perform operations further comprising applying a predicted link threshold operation to the predicted connections to limit a number of predicted connections considered during the grouping of the plurality of nodes.

20. The computer-readable storage medium of claim 18, wherein the graph comprises social networking data received from a social networking server, and wherein the plurality of nodes correspond to a plurality of users of a social networking service provided by execution of a social networking application by the social networking server.

* * * * *

UNITED STATES PATENT AND TRADEMARK OFFICE
CERTIFICATE OF CORRECTION

PATENT NO. : 8,875,305 B2  
APPLICATION NO. : 13/887588  
DATED : October 28, 2014  
INVENTOR(S) : Graham Cormode et al.

It is certified that error appears in the above-identified patent and that said Letters Patent is hereby corrected as shown below:

On the Title Page

In the inventors (72), please replace "Balanchander Krishnamurthy" with --Balachander Krishnamurthy--.

Signed and Sealed this
Nineteenth Day of May, 2015

Michelle K. Lee
*Director of the United States Patent and Trademark Office*